Feb. 13, 1934.   R. A. SCHAFER   1,946,503
GEAR PUMP AND MOTOR CONTROL MECHANISM
Filed June 23, 1931   5 Sheets-Sheet 1

Fig. 1.

Inventor
Robert A. Schafer
By Attorneys
Nathan, Bowman + Helfrich

Feb. 13, 1934.    R. A. SCHAFER    1,946,503
GEAR PUMP AND MOTOR CONTROL MECHANISM
Filed June 23, 1931    5 Sheets-Sheet 3

Inventor
Robert A. Schafer
By Attorneys
Nathan, Bowman & Helferich

Feb. 13, 1934.  R. A. SCHAFER  1,946,503
GEAR PUMP AND MOTOR CONTROL MECHANISM
Filed June 23, 1931    5 Sheets-Sheet 5

Inventor
Robert A. Schafer
By Attorneys
Nathan, Bowman & Helferich

Patented Feb. 13, 1934

1,946,503

UNITED STATES PATENT OFFICE 1,946,503

GEAR PUMP AND MOTOR CONTROL MECHANISM

Robert A. Schafer, Richmond, Ind., assignor to The National Automatic Tool Company, Richmond, Ind., a corporation of Indiana Application June 23, 1931. Serial No. 546,283

14 Claims. (Cl. 60—52)

This invention is directed in general to a hydraulic transmission system and more specifically to such a type system as incorporated in and adapted to operate a machine tool through the variable cycle required in the forming of a metal work-piece.

Hydraulic propulsion means have been recognized to possess certain characteristics rendering them of particular value in the operation of machine tools and various systems have been proposed for this purpose which have proven superior in many ways to purely mechanical systems. The success of such hydraulic propulsion systems are primarily dependent upon the manner in which they may be controlled and the present invention is directed to such problem as thus broadly stated.

In accordance therewith it is a direct purpose of this invention to render the control means more reliable, positive and accurate in its operation while at the same time making it exceptionally universal in its application and capability of adjustment to produce a wide range of operations and types of cycles. This purpose is achieved, it will be seen, without sacrificing any of the simplicity desired in apparatus of this type, the organization, in fact, being very compact in its arrangement.

A primary factor contributing to the achievement of the desired improvements is the provision of a valve means and related fluid passages such that a complete cycle, as normally employed in a machine tool, is derived from the progressive movement of the valve in a single continuous direction from an initial position of rest to a final neutral position. There is no retracing of the path of movement of the valve throughout a complete working cycle to arrive at one event from the next preceding event. The valve is continuously under the influence of an impositive force, such as a spring, and is successively snapped from one position to another as latch means associated therewith are released.

In many of these broader aspects the arrangement and operation is like that disclosed in my copending application, Serial No. 484,691, filed September 26, 1930. In the former application I have disclosed a type of system in which the main valve means mounted on and operated by the machine serves as its primary function to control the application of fluid to a pump adjusting means which varies the rate and direction of flow of hydraulic fluid from said pump. The pump in that case is connected directly to the power motor.

The disclosure in the present application is of a system in which the primary valve means under direct control of the machine itself and the operator serves as a distributing means inserted between the pump and the motor and controls the hydraulic fluid directly. The primary valve means also have auxiliary conduits and means which serve to vary mechanism in the pump for varying the rate of discharge thereof. The present arrangement in general is particularly adapted to control the supply of hydraulic fluid to a motor in a system employing as its source of power fluid a somewhat special type of pump commonly known as a selective delivery pump.

An important feature of this invention vitally concerned with the achievement of the above objects is the provision of a special mechanism designed to be conjointly operated manually and automatically to impart the desired movements referred to in connection with the valve means. This mechanism includes a manually operable lever associated therewith in such manner that movement thereof through its normally operative range merely serves to position the valve means in an initial neutral position subjected to an impositive force, the power motor remaining idle. No change in the cycle occurs, i. e. the machine tool head does not partake of any movement until release of the manual lever by the operator. Accordingly, when the operator moves the lever to its initial position to institute a cycle, usually a rapid traverse toward the work as a first step, and thereafter through forgetfulness or having his attention distracted fails to release the lever, no movement of the head occurs during that time and there is no danger, therefore, of the tools engaging the work at a rapid rate with the consequent breakage and delays.

A further major object accomplished by this invention is the elimination of any liability of improper manipulation of the mechanism, particularly in emergency cases. It frequently occurs in a normal operation of the machine that some circumstance arises which renders it necessary that the machine be reversed in its operation and the head be caused to cease forward movement and preferably to move away from the work. In such emergencies it becomes extremely urgent for the operator to reverse the machine as quickly as possible and such action should, as a matter of fact, be capable of being accomplished automatically without the slightest deliberation. In the present construction there is but one lever available and there can be no possible confusion as to which lever to operate. Further, there is but one manner of operating this lever and but one position to which it may be moved at the time that such emergencies arise. The operator, therefore, is not required to move the control lever with deliberation and with slow careful observance as to the position necessary to accomplish reversal of the machine.

A particularly noticeable feature of the manual control means in general is the fact that all the functions to be achieved manually are produced by the same single lever, by the same movement thereof, and in each case through its complete range. Whatever emergency operation or normal working manipulation is desired at the moment such will be accomplished by depression of the manual lever to its positive stop position it being thereafter automatically returned. This is particularly convenient, and the operation of the machine made more efficient by reason of the fact that it enables the manual control lever to be incorporated in the form of a foot treadle.

More specific objects of the invention reside in the particular provision and arrangement of a compound interference or latch means designed to ensure the correct positioning of the valve means in its automatically produced series of steps.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
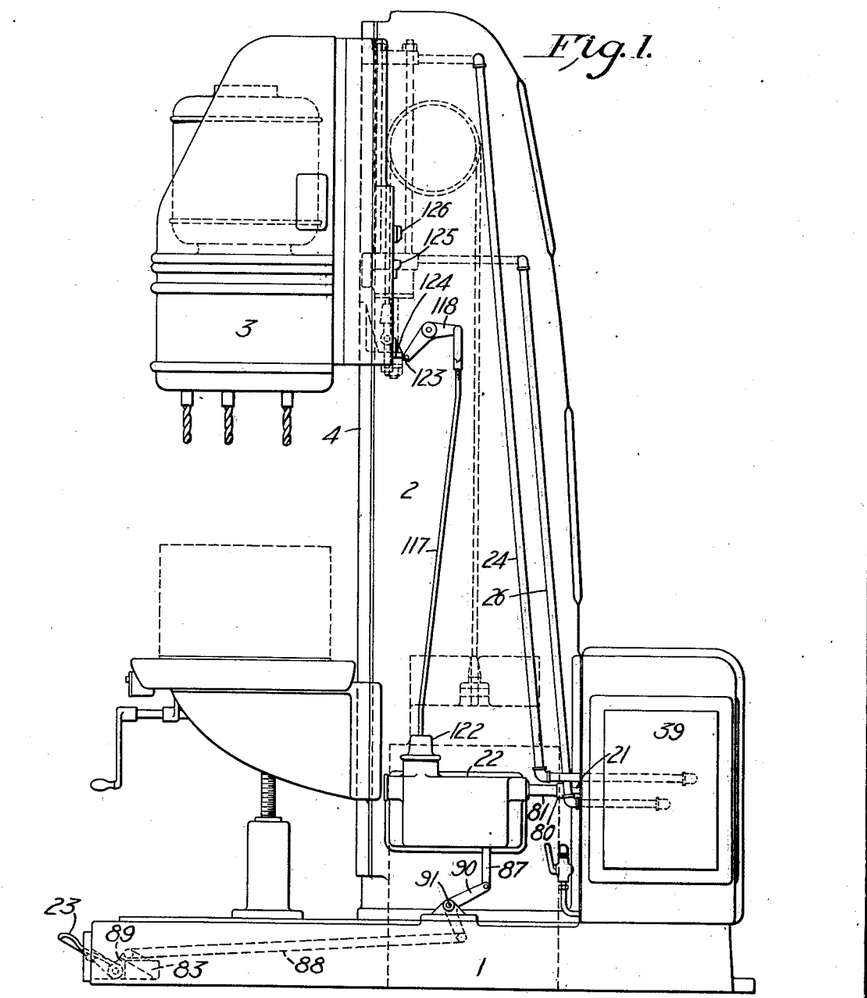
Figure 1 is a side elevation of a multiple drilling machine with the present invention bodied thereon.
Figure 2:
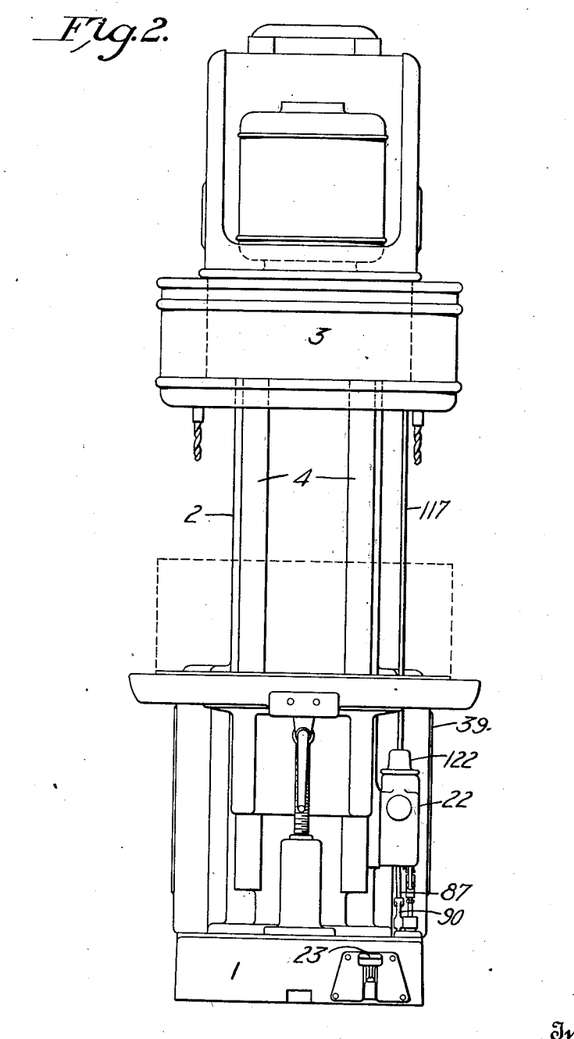
Fig. 2 is a front elevation thereof.

More specifically referring to the drawings, a typical adaptation of the invention is shown applied to a multiple spindle drilling machine comprising a base 1, supporting a column 2, having a translatable tool head 3 slidable on vertical ways 4.

Figures 3, 10, 11:
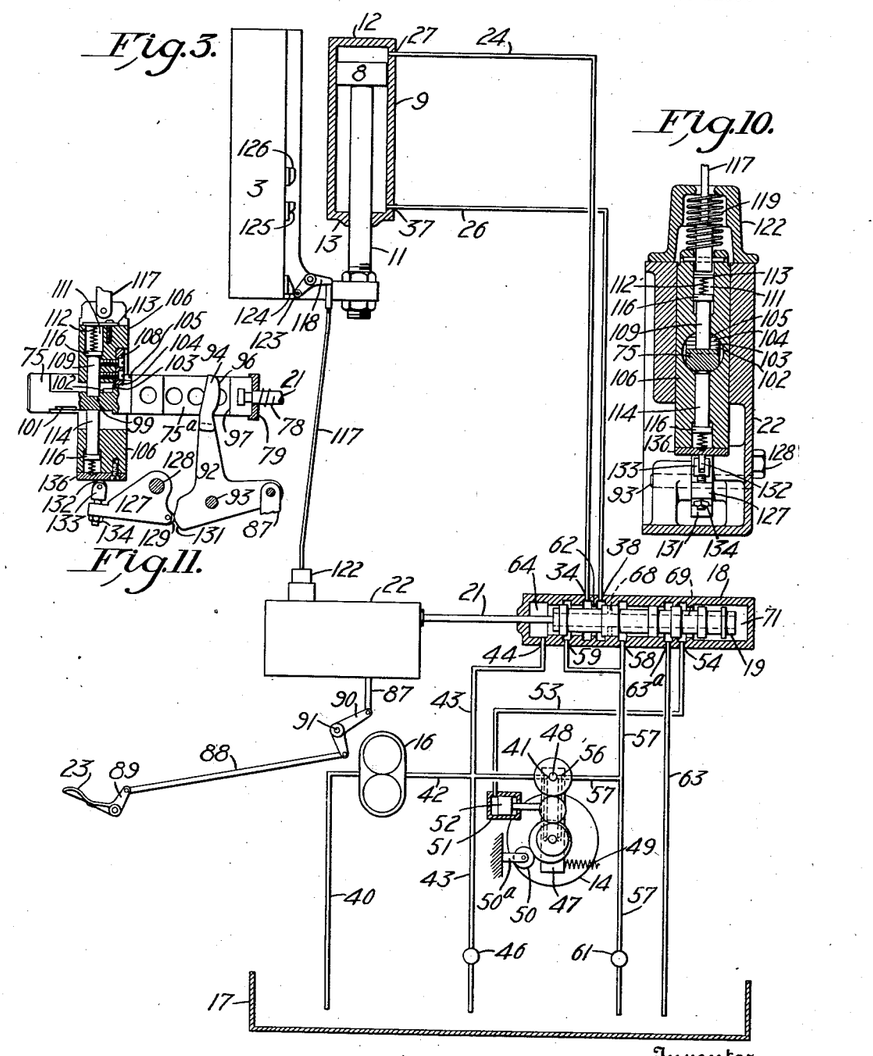
Fig. 3 is a fragmentary view, partly in section, showing the interference mechanism, and also the unitary pump and valve construction.
Fig. 10 is a detail view of the trip plunger taken through and at right angles to the valve slide bar.
Fig. 11 is a fragmentary view of the valve actuating linkage illustrating the relation of the elements upon operation thereof for an emergency release.
Figure 4:
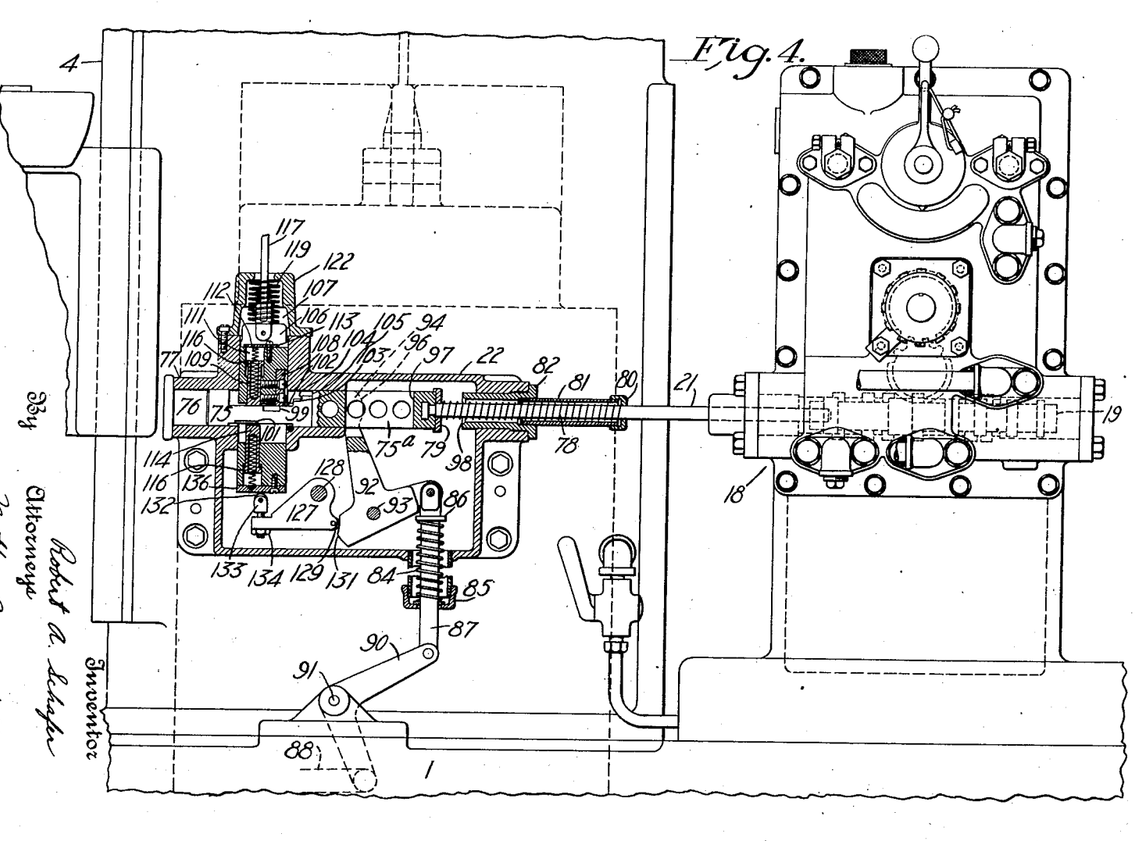
Fig. 4 is a diagrammatic view showing the hydraulic circuit with the control means therefor.

As shown in the diagrammatic Figure 3, the movements of the head throughout a predetermined cycle, is accomplished by means of the corresponding movements of a differential motor-piston 8 reciprocable within a motor cylinder 9 removably mounted on the column, and which is adjustably connected with the tool-head by a piston rod 11. To reciprocate the motor-piston, fluid is delivered to the motor cylinder at its forward end 12 and at its reverse end 13. Fig. 4 shows diagrammatically a type of pump forming a source of pressure fluid which the present invention is peculiarly adapted to control. This figure contains all the features of the pump essential and necessary, in connection with the related mechanism disclosed, to a full understanding of this invention. Further details of a pump of this general class, if desired, may be found in United States Patent No. 1,753,562 issued June 20, 1927.

As shown in Fig. 3 the pumping mechanism includes a high pressure, relatively low volume, selectively variable delivery pump 14 adapted to operate in conjunction with a low pressure, high volume, constant delivery gear pump 16, both of which are driven by a prime mover such as an electric motor (not shown). The fluid supply therefor is obtained from a suitable reservoir 17.

To control the passage of fluid in the hydraulic circuit a control valve means 18 is interposed intermediate the motor cylinder 9 and the pumps 14 and 16. This valve means includes a piston-type valve member 19 connected with a slide bar 21 which is actuated by mechanism located within a casing 22 removably secured to the column. The operation of the valve control mechanism is governed by a foot treadle 23; and also by automatic trip mechanism designed to actuate the piston throughout a predetermined working cycle in a manner described below in detail.

The conduit connections between the motor cylinder 9 and the control valve 18 consist of pipe lines 24 and 26. Pipe 24 leads from a forward port 27 in the cylinder to a forward port 34 in the valve casing; and pipe 26 connects a port 37 in the cylinder and a port 38 in the valve casing.

Viewed in Figs. 1 and 2, the pumping means heretofore briefly referred to are located as a unitary assembly within a casing 39 removably mounted upon the base 1. The constant delivery gear pump 16 continually draws from the supply in the reservoir 17 through a pipe line 40 and supplies the selective delivery piston pump 14, at its intake port 41 through a pipe line 42 which line likewise connects with a pipe line 43 leading to a low pressure supply port 44 of the valve 18. Any excess fluid is by-passed back to the reservoir through a relatively low pressure relief valve 46. In regard to the construction of the variable delivery pump, suffice it to say that it may consist of one of the well known radial cylinder reciprocatory type of pumps having an adjustable pintle the normal position of the members being concentric, wherein no pumping action is accomplished when, however, a shiftable lever 47 connected therewith and pivoted at 48 is moved against the pressure of a spring 49 the members assume an eccentric position and the delivery is increased in accordance with the degree of eccentricity. The mechanism for moving the lever 47 consists of a roller 50 mounted upon an adjustable member 50ª secured to the casing, adapted to provide a stop against which the lever is urged by the spring 49. Further means for moving the lever is provided, consisting of a small cylinder 51, and a piston plunger 52 therein, connected with the valve 18 by a pipe line 53 leading to a volume control port 54 in the valve. Hydraulic pressure within the cylinder 51 depresses the piston plunger 52 against the lever, shifting it, and thereby varying the eccentricity. Normally, the roller is adjusted to keep the members slightly eccentric and, therefore, constantly to maintain the selective delivery pump operating at a relatively low rate. To increase the rate or volume of delivery, the piston 19 is shifted to a position permitting fluid to enter the cylinder 51 and depress the plunger 52. The rate of fluid displaced is commensurate with the distance the lever is moved. To direct the passage of the displaced fluid to the control valve 18, an outlet port 56 of the variable delivery pump is connected to a pipe line 57 leading to two high pressure supply ports 58 and 59 in the valve, any excess liquid being released into the reservoir through a high pressure relief valve 61.

A description of the functioning of the control valve 18 may best be shown perhaps with respect to the movements of the shiftable valve member 19 to effect a typical working cycle, wherein the tool head 3 may be actuated from a neutral position to a rapid traverse forward, followed by a slow forward feeding movement, then by a rapid traverse and finally by a second neutral or stationary position. To illustrate these respective positions of the valve member in detail, attention is directed to Figs. 5 to 9 inclusive, wherein it will be observed that the movement is in a straight line; i. e., in Fig. 5 the valve member is at the extreme right of the cylinder which is the location assumed when the tool head is in the initial neutral position. From this position the valve member is progressively moved to the opposite end of the cylinder to the position shown in Fig. 9.

Figure 5:
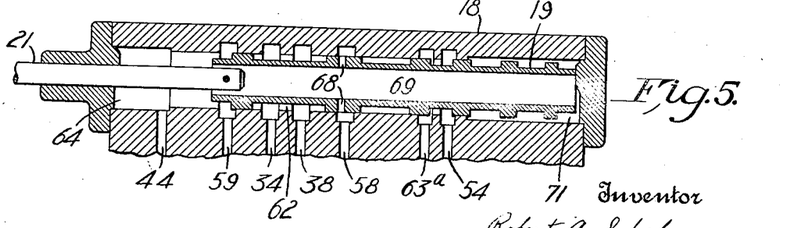
Figs. 5, 6, 7, 8 and 9 are sectional views of the control valve in different positions of a working cycle, showing respectively the neutral or starting position, the rapid traverse forward, the feed; the rapid reverse; and the final neutral or stop position.

For the purpose of noting the various connections in the hydraulic circuit during the initial neutral position, the diagrammatic Figure 3 may be conveniently referred to in conjunction with Fig. 5. While the valve member is in the position of Fig. 5 the motor piston 8 is relieved of all pressure and will remain at rest since the lines 24 and 26 are open to each other through the chamber 62 and the chamber itself is closed from all other communication. Communication is provided between the volume control port 54 and a drain pipe 63 leading from a drain port 63ᵃ to the reservoir 17 which is open to atmospheric pressure, and consequently no pressure is exerted upon the piston 52. However, the selective delivery pump is supplying fluid at a relatively low rate due to its displacement by the roller 50, and therefore fluid is delivered through line 57 and enters the control valve 18 through the high pressure supply ports 58 and 59 where it opposes the low pressure in the chamber 64 supplied by the gear pump through the line 43. The combined fluid of the two pumps is by-passed through the low pressure relief valve 46 into the reservoir. The connection between the high pressure supply port 58 and the chamber 64, is through a diametrical bore 68 in the valve member 19 leading to the hollow interior 69 extending the entire length of the piston and opening into the end chambers 64 and 71 of the valve casing.

Figure 6:
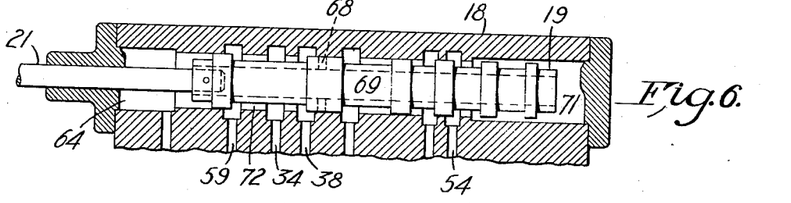

For rapid traverse forward (down) of the tool head 3 the valve member 19 is moved to the position shown in Fig. 6 wherein fluid from the gear pump enters the chamber 64 and passes through the longitudinal bore 69 into the chamber 71 which is opened to the volume control port 54 whereby the pressure against the piston 52 causes the piston pump to deliver fluid at an increased rate. It will be observed that no fluid can escape from the diametrical bore 68 due to its being blocked against the cylinder wall. The fluid displaced from the selective delivery pump 14 enters the control valve 18 through the supply port 59 which, through the chamber 72, is open to both of the ports 34 and 38 and thereby both the upper and lower end of the power cylinder. The piston 8 is caused to move at a rapid traverse forward, due to the differential construction of the piston 8 and the piston rod 11. In the particular construction shown the cross sectional area of the rod is equal to one-half that of the cylinder chamber. The fluid forced out of the port 37 flows through the line 26 and combines, therefore, with the additional hydraulic fluid supplied by the selective delivery pump to produce a rapid movement of the piston 8.

Figure 7:
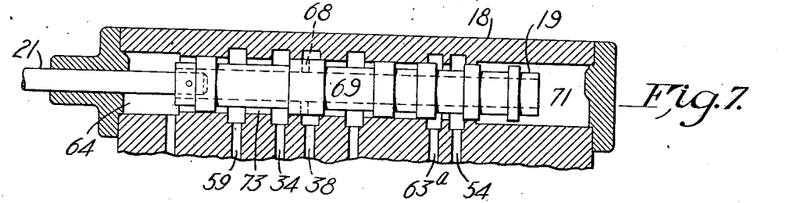

A slow feed of the tool head is effected when the piston is moved to a position shown in Fig. 7, wherein the communication between the volume control port 54 and the drain port 63ᵃ is again open, as in Fig. 5, and consequently no pressure is exerted by the piston 52 against the lever 47; and therefore the variable delivery pump operates at a relatively slow rate in accordance with the eccentricity produced by the roller 50. The fluid then enters the control valve 18 through the high pressure supply port 59, which is open to the port 34 through the chamber 73, and is conducted through the pipe line 24 to the forward end 12 of the motor cylinder. As the piston 8 advances, the fluid from the lower end 13 of the power cylinder is forced out the port 37 and conducted through the reverse port 38 into the diametrical bore 68 leading to the longitudinal bore 69 and therefrom into the chamber 64, where it combines with the fluid from the gear pump and passes into the reservoir through the low pressure relief valve 46.

Figure 8:
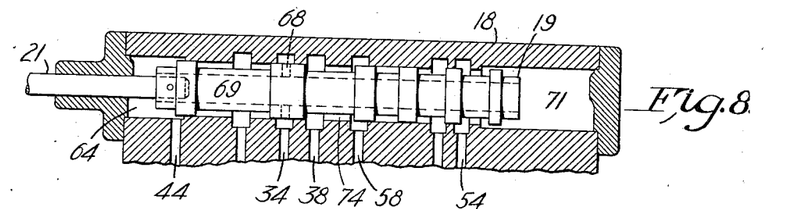

The next position normally assumed by the valve member 19 is shown in Fig. 8, wherein a rapid traverse reverse of the tool head is effected. In this position the discharge from the gear pump is directed to the low pressure supply port 44, passes through the chamber 64, the lateral bore 69, and into the chamber 71 which is open to the volume control port 54, causing an increased displacement of the selective delivery pump as before described. The discharge from the variable delivery pump enters the control valve through the port 58 which is in communication with the port 38 through the chamber 74, and fluid is thereby delivered to the lower end 13 of the motor cylinder, forcing the piston 8 to move in the opposite direction. For disposition of the fluid forced out of the forward end 12 of the motor cylinder, the port 34 is directly in communication with the diametrical bore 68, which conducts the discharge into the longitudinal bore 69 whence it unites in chamber 64 with the fluid coming from the gear pump, and is by-passed through the relief valve 46 to the reservoir.

Figure 9:
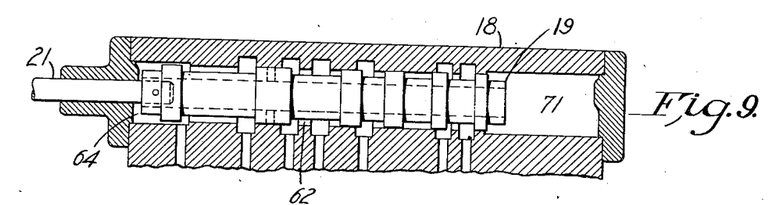

The valve member 19 has a final neutral position as shown in Fig. 9 wherein the ultimate disposition of the fluid is the same as in the initial neutral position shown in Fig. 5, with the opposite sides of the power piston 8 connected through chamber 62 free of pressure and the piston and tool head at rest, therefore.

There has been disclosed, it will be seen, an arrangement and relation of elements and various fluid passages whereby important advantages have been achieved including particularly that of a control means in which the valve means moves progressively in a continuous direction through successive steps of a cycle including a neutral position at each end thereof. There will now be described the mechanical actuating means which serves to produce this movement. A primary feature thereof, as will appear, is the fact that the valve is moved by this mechanism to each successive position by a quick snap action as contrasted for example with a relatively slow acting cam operating positively against the valve. This series of positions and manner of operation includes the movement from the initial neutral position to the final one where the head remains at rest. The valve arrangement conjointly with the novel actuating mechanism eliminates the necessity for moving the valve means back through one or more of the operative positions to arrive at the final neutral position.

The details of the actuating mechanism are shown in Fig. 4. The various positions assumed thereby are in accordance with the respective valve positions described and are each shown in independent figures in my copending application, Serial No. 484,691, filed September 26, 1930. However, a complete description thereof will be given herein in connection with Fig. 4 of this present application. As shown therein the primary member is a trip block 75, slidable within a bore 76 formed within a bracket 77 of the casing 22. The block 75 has joined thereto the valve rod 21. Normally, the block 75 is urged to the left by impositive means such as a spring 78 coiled about the valve rod and inserted between a washer 79, secured to the trip block, and an outer bearing cap 80 fixed upon a tubular member 81 protruding from a sleeve 82 threaded within the casing 22. The trip block is adapted to be moved to the right by the operator depressing the treadle as will be presently shown.

To maintain the treadle in its normal elevated position, impositive means are provided such as a weight 83 attached thereto, and/or a spring 84, held within a bracket 85 of the casing, which exerts an upward pressure against a collar 86 of a rod 87, connected with the treadle by linkage consisting of a bar 88 pinned to an arm 89 of the treadle and which bar is also pinned to one arm of a bell crank 90 pivoted at 91 on the base 1, the other arm of the bell crank being pinned to the rod 87. A bell crank 92 pivoted at 93 in the casing 22 has one arm pinned to the rod 87 and another forked arm 94 straddling a narrowed portion 75a of the slide bar 75. Depression of the treadle causes the rounded cam surfaces 96 of the bell crank 92 to engage the shoulders 97 of the trip block 75 which forces the trip block and the valve member 19 to the right until an abutting surface is engaged such as stop washer 79 contacting with the surface 98 of the sleeve 82. In this location the valve 19 is in the initial neutral position as shown in Fig. 5.

To cause the trip block 75 and the piston 19 to be successively stepped to the left by a snap-action and thereby effect the passage of fluid through the control valve 18, in accordance with the desired cyclic movement, the trip block is cut away to form slots 99 and 101 and stepped shoulders 102, 103, 104 and 105, adapted to be engaged by interference means now to be described. A trip plunger 106 is provided having an opening 107 through which the bar 75 is slidable as particularly shown in Fig. 10. To intercept the movements of the trip block 75 to the left, the trip plunger 106 is fitted with a wear-plate 108 removably secured thereto and adapted to successively engage the steps or shoulders 102, 103, 104 and 105.

With respect to the slot 99, additional interference mechanism is provided consisting of a latch bolt 109 received within a vertical bore 111 in the trip plunger 106, and urged inwardly by a spring 112 bearing against a plate 113 removably secured to the trip plunger. Another latch bolt 114 is similarly provided to engage the slot 101, and each of the latch bolts are provided with annual shoulders 116 slidable in an enlarged portion of the respective bore. The latches are independently slidable, therefore, in the plunger 106 but are limited in their inward movement relative thereto.

Automatic means for operating the trip plunger is provided through a trip rod 117, pinned at its lower end to the plunger, and adjustably secured at its upper end to a bell crank 118 pivotally mounted upon the column. Although the trip plunger is constantly urged downward by a spring 119 arranged between the plunger and a retainer 122 removably secured to the bracket 77, it is adapted to be elevated against the pressure of the spring 119 by means of a roller 123 carried by the bell crank 118 engaging a trip dog 124 adjustably secured to the head 3. Additional adjustable trip dogs 125 and 126 are carried by the head, and arranged to engage the roller 123 as the tool head moves forward, thereby causing corresponding movements of the valve 19, as will be seen with respect to a description now to be given of the correlative movements throughout the entire machine to effect each step of a typical working cycle.

To describe the initial neutral position, assume that a previous cycle has been completed, and that a new cycle is desired to be effected, and that the tool head 3, therefore, is in an elevated position, whereby the dog 124 is engaged with the roller 123 causing the trip plunger 106 to be elevated depressing the spring 119. The operator has not as yet depressed the treadle 23, and therefore the shiftable valve member 19 is located in the neutral position shown in Fig. 9. However, when the operator depresses the treadle, the valve 19 is shifted to the neutral position seen in Fig. 5, before described, wherein the head remains stationary, so long as the operator maintains his foot on the treadle.

To effect the next cyclic position the operator removes his foot from the treadle whereupon the spring 78 moves the trip block 75 to the left until intercepted by the latch bolt 114 becoming engaged with the slot 101. The valve 19 is now located as shown in Fig. 6, and a rapid traverse forward of the head is, therefore, effected. As the head moves downward the dog 124 is disengaged from the roller 123 and the spring 119 forces the trip plunger 106 downward, until it engages the shoulders 116 of the latch lock 114 thereby disengaging the lock from the slot 101, while the wear-plate 108 is simultaneously lowered and engages the step 102 as the trip block 75 is snapped to the left by the spring 78. However, this movement of the block is relatively slight and insufficient to materially alter the position of the valve member 19, and the passage of fluid in the valve 18 continues as shown in Fig. 6. The purpose of the latch bolt 114 is, it will be seen, to prevent the trip block 75 from being moved to the left until the head 3 moves downwardly a sufficient distance to disengage the dog 124 from the roller 123, whereby the wear-plate is then in position to engage the step 102.

The rapid traverse forward is changed to a slow feed movement when the dog 125 engages the roller 123, thereby elevating the trip plunger 106 sufficiently to disengage the wear-plate 108 from the step 102 and to permit the spring 78 to snap the trip block 75 to the left until stopped by the engagement of the step 103 with the wear plate; and the valve member is then located as shown in Fig. 7.

In the normal cycle, the next predetermined position of the control piston is that shown in Fig. 8, causing a rapid reverse of the tool head, and results from the engagement of the dog 126 with the roller 123 whereby the plunger 106 is elevated a further amount disengaging the wear-plate 108 from the step 103. The block 75 is snapped to the left, but is intercepted by the wear-plate coming in contact with the step 104.

As the tool head is elevated, the final neutral position is determined by the engagement of the dog 124 with the roller 123. Thereby the plunger 106 is still further elevated, permitting the slide bar to move to the left until shoulder 105 engages the wear plate and the valve member 19 is located as shown in Fig. 9.

From the typical cycle described it will be noted that the valve member partakes of a straight line progressive movement from the start of the cycle until a final neutral or position of rest for the head is arrived at. Each change of position of the valve and corresponding step in the cycle of the machine is effected through a quick snap action movement. The only period that this is not true is when the head is in its retracted position. Relatively slow movement of the valve during that period through various operative positions to arrive at the desired neutral position obviously produces no disadvantageous results.

An emergency feature is incorporated, designed to materially reduce the danger of injury from improper operation, whereby the operator need but depress the foot treadle at any time while the head is moving downward to institute a rapid reverse. This mechanism and its operation is most clearly shown in Fig. 11. As noted therein this mechanism includes a cam lever 127 loosely mounted upon a stud 128 of the casing 22 and provided with a roller 129 adapted to engage a cam surface 131 of the forked lever 92, and also provided with a roller 132 mounted in a clevis 133 threaded in the cam lever and adjustably secured by a jam nut 134. At any moment during the downward movement of the head should an emergency arise, such as tool breakage, depression of the treadle will cause the cam surface 131 of the forked lever 92 to exert pressure against the roller 129, in turn causing upward pressure of the roller 132 against a plate 136 removably secured to the trip plunger 106. The trip plunger is thereby elevated sufficiently to disengage the wear-plate 108 from interference with the movement of the trip block 75 and the spring 78 moves the block 75 to the left until intercepted by the engagement of the latch bolt 109 with the slot 99; in which position the valve 19 is located substantially as in Fig. 8. The tool head is consequently operated at a rapid reverse. It will be observed that the upward movement of the roller 132 is not sufficient to cause the latch bolt 109 to become disengaged from the slot 99, for the reason that the roller 132 is adjusted to permit only the proper elevation necessary to disengage the wear-plate, at which point the cam surface 131 slides by the roller 129 and the upward pressure against the plate 136 is released. Should the operator exert continued pressure upon the treadle 23, the latch bolt 109, which is still seated in the slot 99, prevents further movement of the block 75 to the right, and therefore the head 3 continues to operate at a rapid reverse until the dog 124 engages the roller 123 as in the normal cyclic movement. The trip plunger 106 at this point is elevated, lifting the latch bolt 109 with it due to engagement with the shoulder 116, and the trip block is moved to the left until engagement of the shoulder 105 with the vertical trip plunger, at which time the valve 19 is again in the neutral position, and the tool head 3 is at rest.

The arrangement of the manual control means for initiating a cycle or for reversal of the machine in case of an emergency is extremely simple and fool-proof. Both of these functions are incorporated in a single lever here shown as a foot treadle. Since rapid traverse or any movement of the head does not take place until the operator removes his foot from the treadle there is no danger of the machine tools engaging the work at a rapid traverse rate e. g. through failure of the operator to release the control lever in time.

No deliberation or careful selective movement of control lever is ever required. For every change in the cycle to be produced by manual manipulation the operation consists simply of a complete movement of the manual lever to its extreme position. This obviously is exceedingly advantageous in the case of an emergency release.

In conjunction with the advantages derived from the adaptation of a single control lever, and the safety features described, it is seen that a new and useful fluid transmission is provided which, though relatively simple in construction and flexible in its adaptation, nevertheless is exceptionally reliable.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be and are intended to be, comprehended within the meaning and range of equivalency of the following claims.

Having thus revealed this invention, I claim as new and desire to secure the following combinations and elements, or equivalents thereof, by Letters Patent of United States:—

1. An hydraulic transmission combining a propulsion motor operable in forward and reverse directions; a source of hydraulic fluid under pressure; fluid conduits and valve control means therein for selectively directing the fluid to and from said motor to cause a cycle of forward and reverse movements thereof, said valve control means also having two distinct neutral positions, within its normal range of movement for said cycle in which no fluid is admitted to said motor.

2. An hydraulic transmission combining a power motor; a source of hydraulic fluid under pressure; fluid conduits connecting said source and said motor; valve means in said conduits; means for shifting said valve means in its normal operation through a series of predetermined positions to govern the flow of fluid in said conduits and thereby the cycle of said motor, two of said valve positions being neutral positions remote from each other in which no fluid is passed to operate said motor.

3. An hydraulic transmission combining a power motor; a source of hydraulic fluid under pressure; fluid conduits connecting said source and said motor; valve means in said conduits; means for shifting said valve means in a continuous direction through a series of predetermined positions to govern the flow of fluid in said conduits to produce a cycle of movement of said motor; said positions in the normal operation including a neutral position at each end of said series in which said motor is inoperative.

4. An hydraulic transmission combining a propulsion motor; a source of hydraulic fluid under pressure; fluid conduits connecting said source and said motor; valve means in said conduits; means for operating said valve means through a series of predetermined positions to govern the flow of fluid through said conduits and produce a cycle of movements of said motor, said valve positions including two distinct neutral positions remote from each other in the series of positions in which the fluid is controlled to render said motor inoperative; and means controlled by said valve means in its operation for varying the rate of flow of the fluid and thereby the speed of operation of said motor.

5. A machine tool combining a frame; a head translatable thereon; a hydraulic transmision for translating said head; control valve means therefor; means for progressively moving said valve through a series of successive operative positions in a continuous direction for effecting a cycle of forward and reverse movements of said head, said valve means having an initial and a final neutral position in each of which said hydraulic transmission is ineffective to translate said head.

6. A machine tool combining a frame; a head movably mounted thereon; a hydraulic motor for operating said head; a pump for supplying hydraulic fluid under pressure to said motor; means for selectively varying the rate and direction of flow of liquid to said motor; valve means for controlling said selective means; impositive means for urging said valve means in one direction; means for moving said valve means in the opposite direction against said impositive means; releasable interference means for restraining said valve means in predetermined positions, said valve means having two neutral spaced positions in which no liquid is delivered by said pump.

7. A machine tool combining a frame; a head translatable thereon; a hydraulic transmission for translating said head; control valve means therefor having two neutral positions in which said hydraulic transmission is ineffective to translate said head; automatic means operable in accordance with the movement of said head for moving said valve means to one of said neutral positions; and manually operable means for moving said valve means to the other of said neutral positions.

8. A machine tool combining a frame; a head translatable thereon; a hydraulic transmission for translating said head; valve means therefor to control the rate and direction of movement of said head; manual means to move said valve means to an initial neutral position wherein said hydraulic transmission is ineffective to translate said head; and automatic means for moving said valve means through a series of different operative positions to effect a cycle of movement of said head to a second neutral position of said valve wherein said hydraulic transmission is likewise ineffective to translate said head.

9. A machine tool combining a frame; a head translatable thereon; a hydraulic motor for translating said head; a selective output hydraulic pump for supplying hydraulic fluid to said motor; means for controlling the delivery of hydraulic fluid to said motor from said pump movable through a range of predetermined positions to effect a flow of hydraulic fluid to said motor at different rates and directions, said means having two neutral positions adjacent opposite ends of said range wherein no liquid is delived from said pump to operate said motor.

10. A machine tool combining a frame; a head movable therein; an hydraulic transmission for operating said head in forward and reverse directions; valve means therefor to control the rate and direction of movement of said head for a predetermined cycle; means for progressively operating said valve means through a series of successive positions to produce said cycle, said series of positions including a first neutral position wherein said transmission is ineffective to operate said head, succeeding positions in the same cycle wherein said head is operated in forward and reverse directions, and a subsequent distinct second neutral position in the same cycle in which said transmission is ineffective to operate said head.

11. A machine tool combining a frame; a head movable thereon; an hydraulic transmission for operating said head in forward and reverse directions; control means therefor to govern the direction of movement of said head for a predetermined cycle; and means for intermittently and progressively operating said control means in a continuous direction through a series of successive positions to produce said cycle, said series of positions comprising a first neutral position wherein said transmission is ineffective to operate said head, succeeding positions wherein said transmission is effective to operate said head in forward and then reverse directions, and a subsequent and second neutral position remote from the first wherein said transmission is ineffective to operate said head.

12. A machine tool combining a frame; a head movable thereon; an hydraulic transmission for operating said head; valve means therefor to control the rate and direction of movement of said head for a predetermined cycle; means for intermittently and progressively operating said valve means through a series of successive positions to produce said cycle, said positions including two distinct neutral positions remote from each other in which said hydraulic transmission is ineffective to operate said head, and intervening positions wherein said transmission is effective.

13. An hydraulic transmission combining a motor; means for supplying hydraulic fluid under pressure to said motor; control means therefor to vary the flow of liquid to said motor to produce a predetermined cycle of movements; and means for intermittently and progressively operating said control means through a series of positions to determine said cycle, said series including a first neutral position wherein no liquid is delivered to said motor, succeeding positions wherein liquid is supplied to said motor, and a subsequent and second neutral position wherein no liquid is supplied to said motor.

14. An hydraulic transmission combining a propulsion motor operable in forward and reverse directions; a source of hydraulic fluid under pressure; fluid conduits and valve control means therein for selectively directing the fluid to and from said motor; and means for intermittently and progressively operating said valve control means in a continuous direction through a series of positions to produce a cycle of forward and reverse movements of said motor, said series including an initial neutral position wherein no liquid is delivered to operate said motor, succeeding positions wherein liquid is delivered to operate said motor in forward and reverse directions, and a second neutral position distinct and separate from said first neutral position wherein likewise no liquid is delivered to operate said motor.

ROBERT A. SCHAFER.